UNITED STATES PATENT OFFICE.

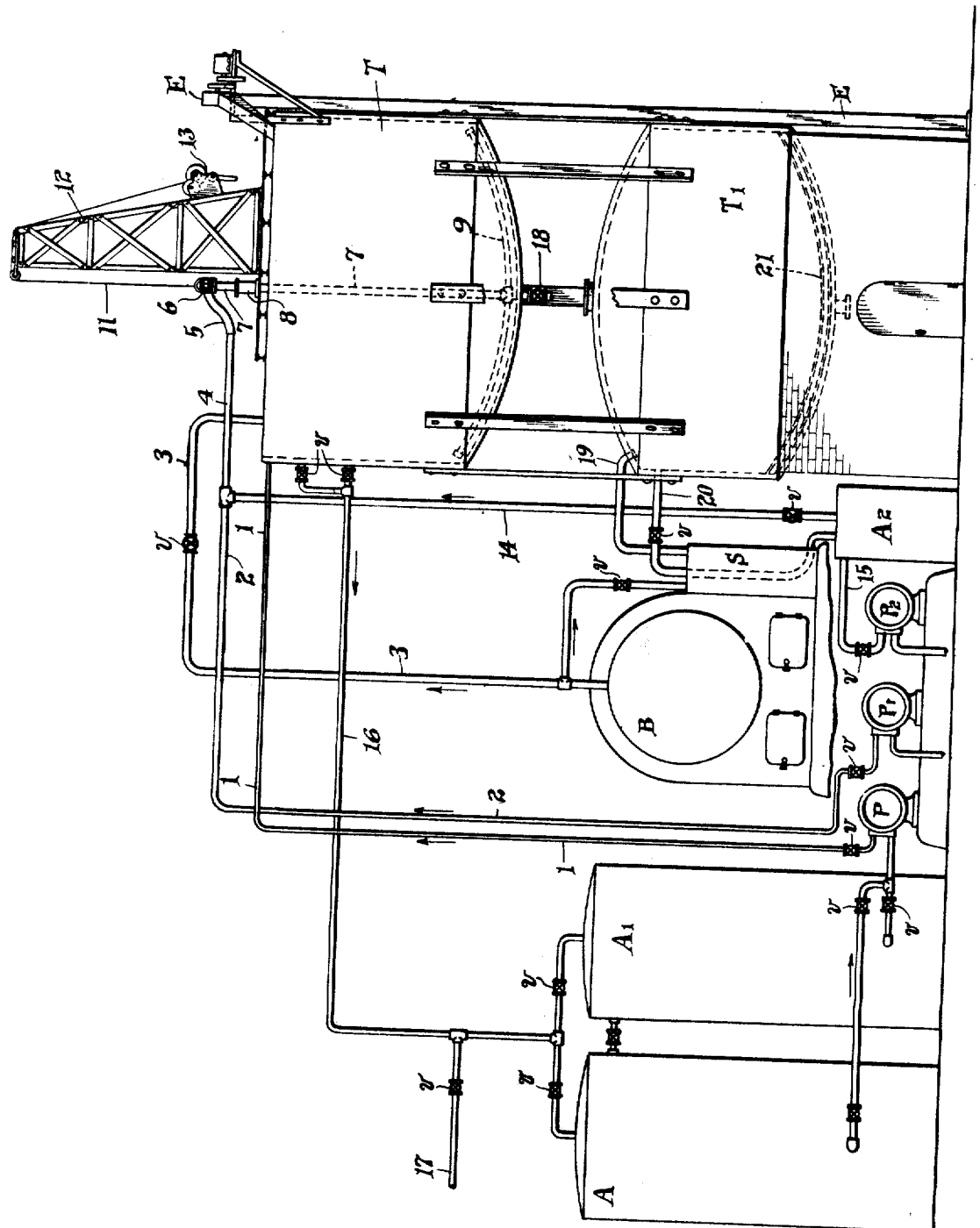

MICHAEL J. WELSH, OF PHILADELPHIA, PENNSYLVANIA, ASSIGNOR TO THE ATLANTIC REFINING COMPANY, OF PHILADELPHIA, PENNSYLVANIA, A CORPORATION OF PENNSYLVANIA.

EARTH-TREATING PROCESS AND PRODUCT.

1,132,054.

Specification of Letters Patent. Patented Mar. 16, 1915.

Application filed June 7, 1913. Serial No. 772,415.

*To all whom it may concern:*

Be it known that I, MICHAEL J. WELSH, a citizen of the United States, residing in the city of Philadelphia and State of Pennsylvania, have invented certain new and useful Improvements in Earth-Treating Processes and Products, of which the following is a specification.

My invention relates to the treatment of materials, such as fullers' earth or other earths, used for filtering, de-colorizing, purifying or otherwise acting upon fluid or liquid substances, such as oils in general, and particularly mineral or petroleum oils, and melted paraffin or other wax, stearic acid, etc.

It is the object of my invention to so treat the earth, such as those referred to, and particularly fullers' earth, that it shall retain its useful properties for a longer period, or that a given amount of such material, shall, in virtue of the treatment, be enabled to filter, de-colorize or purify greater quantities of fluid or liquid substance referred to, before becoming spent or of no further practical value for these purposes.

In another of its aspects my invention resides in a restoration or reclamation of the material, such as fullers' earth, after it has become more or less exhausted in the treatment of fluids or liquids, such as oils, melted wax, etc.

My invention resides in the improved material herein described, and in the process of producing the same.

I shall take the treatment of fullers' earth for illustrative purposes and as the preferred form of my invention. Florida fullers' earth, for example, as it is received in the raw or fresh state is first dried, so that it may be granulated and screened to a range of sizes, such, for example, as will pass through a 15 mesh screen but will not pass through an 80 mesh screen. This granulated earth is then transferred to a calcining or roasting furnace and heated until it attains a temperature sufficient to drive off the free moisture, and some of the water of constitution of the fullers' earth constituents. After this calcining treatment the earth is in condition for its first use upon oil, particularly petroleum oil. The fullers' earth, so calcined, may first be used upon some of the lighter or less viscous oils. For this purpose, when earths of the above described granulation are employed, a chamber of any desired dimensions, and provided with a bottom outlet, is charged with this granulated earth, and the oil to be de-colorized or clarified is delivered into the top of the chamber and allowed to percolate through the fullers' earth, and is drawn off at the bottom of the chamber at such rate as gives the desired results. After the calcined earth has so been used in the clarification of some of the petroleum oils of moderate or low viscosity, it may, preferably after further calcining, and with advantage, be employed in the purification or clarification of the more viscous petroleum oils; and if these latter are of great viscosity the filter employing the fullers' earth may be placed in a warm room or be otherwise kept at suitably high temperature to assist the filtration process by reducing the viscosity. Or the calcined earth may be first used on such oils or liquids of great viscosity or may be continuously used on oil or liquids of any grade or viscosity. Generally the filter chamber is constructed pressure tight so that the oils or liquids to be acted upon as well as the fluids used subsequently for cleaning the fullers' earth may be forced through the calcined earth under pressure.

After the fullers' earth has become more or less exhausted as to its powers for so acting upon oils or liquids, the influx of oil or liquid is discontinued and the oil or liquid still within the earth is drained from it. Any oil or liquid remaining after this drainage may be driven out by air blast. And after the application of air blast an oil or liquid solvent, usually naphtha for oil, is delivered into the filter chamber, and by soaking, is made to extract from the earth the oil or liquid that has been contained in it porous structure. The naphtha is in turn displaced by steam blast, the heat of the steam and the water of condensation both aiding in the process. After this treatment of the exhausted earth it ordinarily contains traces of oil or other materials. In this condition it is withdrawn from the filter chamber and transferred to a calcining kiln or furnace where, due to these remaining traces of oils and other materials, combustion with flame results; and when this free combustion ceases additional heat is applied to the earth with the result that the oxygen of the air enters and consumes the carbon or carbonaceous materials deposited in the earth's pores. After this second calcining the fullers' earth may be again used in the treatment of oils as above described; may be again cleaned and calcined, and so on, repeatedly. But it loses some of its efficiency in operating upon the oil or liquid with each handling or calcining, so that with repeated uses with subsequent treatments in the calcining kilns it either entirely loses its valuable operative properties or loses them to so great an extent that the earth is practically exhausted. This loss of efficiency is believed to be due to two causes; first the carbonaceous material is not entirely removed or burned out in each calcining treatment; and second, and of greater importance, even with very careful handling of the earth, incipient fusion results at the calcining temperatures attained, and with the fusion of the earth it of course loses to great extent its operative properties. By my invention however I reclaim or restore fullers' earth so exhausted by repeated actions upon oil or liquid and succeeding treatments in calcining kilns, by treating it with acid of suitable strength. I may use sulfuric, hydrochloric, nitric, or other suitable acid. The effect of the acid upon the spent earth is to dissolve some of its constituent parts, while other constituents are disintegrated, with the result however that the efficiency is increased by the acid treatment. But the more important action of the acid is that the constituents removed are largely the alkaline earths or alkaline earth metals and other constituents which induce, or lend themselves as fluxes in producing, fusion of the earth during the calcining treatment. In other words by the acid treatment some of those materials which cause or lend themselves to the undesirable fusion of the earth, are removed, with the result that in subsequent calcining treatments there is little or no fusion and the efficiency of the earth is maintained or improved. In consequence the exhausted earth so treated is restored or reclaimed; or if the earth has not been completely exhausted, such acid treatment maintains or improves its efficiency. In either case the earth can be used far oftener or in contact with more oil or liquid than in the case of the untreated earth. By my acid treatment the temperature producing destructive or undesirable amount of fusion of the treated earth is raised considerably with respect to the fusing temperature of the untreated earth. In some cases I have found that the acid treatment raises this incipient fusion point to a good red heat as distinguished from a dull red heat for untreated earth. Acid treatment therefore puts the earth in such condition that it materially resists fusion at the temperature of and at all temperatures lower than that reached in the calcining and necessary for the destruction of and removal of the carbonaceous matter from the pores.

The treatment of the fullers' earth by acid may be during a single long period or in several successive short periods. By preference however the earth is subjected to the acid in a single long treatment. It is within my invention to so treat the earth with acid more than once, each time after one or more uses upon oil succeeded by one or more calcining treatments. But a single acid treatment suffices for numerous repeated and subsequent uses upon oil or liquid with corresponding subsequent treatments in calcining kilns. My invention may be viewed also as a treatment of the fullers' earth by acid to remove the fluxing materials, so that the earth may withstand numerous subsequent high temperature treatments in calcining furnaces or kilns without serious reduction of porosity or efficiency by fusion of some of its constituents.

While I have above described my preferred process as involving the use of the fullers' earth upon oil or liquid before the acid treatment, it is to be understood that the acid treatment will improve the earth and render it substantially non-fusing even before use upon oils. That is to say, the raw or fresh earth is first granulated and then calcined. Then it may be treated with acid and thereafter for the first time used upon oil or liquid.

Calcining the fresh or raw earth before acid treatment is preferable because in the treatment of the fresh or raw earth by acid, before calcining, the earth disintegrates, and becomes largely nothing but mud. The chemical composition of the fresh or raw earth is such that its structure is largely destroyed or disintegrated when it is wetted with water or aqueous solution of acid. On the other hand if the raw earth is first calcined the heat causes changes in composition, such as driving off of water of constitution, and other changes, and the earth has then sufficient strength of structure to admit of treatment by acid solution without losing its desired granular form or porosity. However, I may first treat the raw or fresh fullers' earth with acid, thereby reducing a large proportion of it to structureless mud, thereafter washing the mud away, thereafter calcining the residue comprising material having filtering, decolorizing or purifying properties, and using the calcined residue upon oil or liquid. But as outlined above my preference is to calcine the granulated raw earth, then use it one or more times upon oil or liquid, and then after subsequent calcining treat it with acid.

It has been my experience in the treatment of lubricating oils that fullers' earth becomes more or less exhausted after having been used from twelve to fifteen times, while treated fullers' earth can be used economically more than double this number of times. The treated earth can be used until it is destroyed by the breaking down of its porous structure during the handling processes through which it passes; that is to say, by the mechanical destruction of its structure by the wearing away of its granules. It is to be understood that after the acid treatment the acid is removed from contact with the earth and the remaining acid is thoroughly washed out, and thereafter the clay dried before its next contact with oil. Besides oils, other materials in liquid or fluid state may be operated upon by the earth, and particularly, melted paraffin or other wax, and melted stearic acid may be so operated upon. And with respect to stearic acid treatment, it is important that the earth shall have been first treated; for, with untreated earth, the stearic acid attacks the earth, much in the manner of the mineral acid hereinbefore described, and itself becomes more or less neutralized.

In the accompanying drawing I have illustrated apparatus suitable for the hereinbefore described treatment of fullers' earth.

In starting a treatment of the fullers' earth, acid is pumped by acid pump P through pipe 1 into the treating tank T. The acid so pumped may be weak acid from the weak acid tank A, this weak acid being left over from a prior treat, or strong acid from the strong acid tank $A^1$, in which case the strong acid is diluted to the proper strength by mixture with weak acid or with water, the water being delivered by pump $P^1$ through pipes 2, 4, 5, 6, 7 and 9. The depth of the acid solution in the tank T is made sufficient to completely cover the amount of fullers' earth to be treated. The fullers' earth, preferably previously well washed and steamed, is delivered by elevator E into the tank T. As it is being delivered into the acid solution in tank T the agitation of the mixture is begun and continued until all the fullers' earth of the treat has been delivered into the acid solution, and thereafter as long as requisite.

Throughout the drawing the various valves are indicated by the reference character $v$. It will be understood that these valves may be opened and closed at will, to control delivery of the materials to the various parts of the apparatus at various times.

The agitation of the mixture above referred to is accomplished by the introduction of air or water through pipe 4 and flexible hose 5 to the T 6 with which the pipe 7, extending down into the tank T, has a revoluble air tight connection, a suitable ball-bearing for the pipe 7 and the parts attached thereto being provided at 8. At the lower end of the pipe 7 is attached the pipe 9, which may be curved, as shown, in conformity with the bottom of the tank T. This pipe 9 has a plurality of lateral perforations, these perforations on one side of the pipe 7 facing in one direction, and those on the other side of pipe 7 in another direction, so that when water or air under pressure is delivered through pipe 7 into pipe 9, the water or air escapes through these apertures and the reaction causes the pipe 9 with its attached pipe 7 to rotate, and during rotation communication is maintained with the pipe 4 through the T 6. This rotation of the pipe 9 agitates or mixes the material within the tank T, that is, the acid and fullers' earth by carrying around water or air to different parts of the tank T. The T 6 is attached to the chain or cord 11 which passes over the top of the derrick 12 to the windlass 13. By this windlass pipe or agitator 9 may be elevated to different positions as occasion may require. In case air is to be passed through the pipes 7 and 9 the valve in pipe 14 leading to the air storage tank $A^2$ is opened, this tank $A^2$ being connected by pipe 15 with the air pump $P^2$.

Steam admitted to tank T through pipe 3 raises the temperature of the mixture preferably to the boiling point. The agitation is kept up for a suitable length of time while the mixture is kept near or at the boiling point. The agitation may then be discontinued for a suitable length of time and repeated at intervals during the treatment. And throughout the treatment the mixture is kept at or near the boiling point as stated.

When it is found that the acid ceases or nearly ceases to act, the operation of washing the acid from the earth is begun. For washing, water is forced by pump $P^1$ through pipes 2 and 4 into the tank T through pipe 9 until the latter is nearly filled. The contents of the tank are now thoroughly mixed, and the earth allowed to settle. The liquid in the tank is then drawn off through the valves and connections situated above the earth line in the tank, the liquid in this operation passing off through the draw off pipe 16. Preferably this liquid is delivered to the weak acid tank A, any surplus being discharged to the sewer through pipe 17. The washing is then continued by filling the tank T with water, mixing it well with the earth, and allowing the earth to settle, drawing off the water into the sewer through pipes 16 and 17. This washing is continued until the liquid discharged from the tank T is clear and free from acid. When the earth has been satisfactorily washed, the mass is agitated while mixed with sufficient water to cause the mixture to readily flow through the bottom cock of tank T into the lower or drying tank or chamber T¹. The water of the mixture is now drained off through the bottom of tank T¹. Steam from the boiler B, super-heated in the super-heater S is delivered into the tank T¹, now tightly closed at its top, through pipe 19. This steam is forced through the earth from above for the purpose of removing a portion of the water remaining in the earth and for heating the earth. When the earth has been so treated by steam and thoroughly heated throughout, compressed air, from tank A², heated in the super-heater S, is passed through pipe 20 into the tank T¹ through the earth. In this connection it will be understood that the tank T¹ is provided with a perforated false bottom 21 over which is placed a filter cloth of canvas or other suitable material, the steam or air current passing through the earth and out through the false bottom. When 30 Bé. acid and fifty tons of earth are used in the above mentioned treatment, I have found that it requires approximately 96 hours' duration of contact between earth and acid and substantially 48 hours for the washing process before the earth is ready for the drier T¹.

The earth having been treated and dried as above described, it is removed from the tank T¹ and further dried as in kilns or calcined and is then in condition for further treatment of oil or liquid as hereinbefore described.

Pursuant to a requirement for division, I do not herein claim the treating apparatus, the method of treating or preparing raw fullers' earth or earthy material of similar characteristics, nor the product resulting from such method, nor the method of preparing fullers' earth or earthy material of like characteristics for action upon organic acid, such as stearic acid, nor the method of treating stearic acid, the same being claimed in my co-pending application Serial Number 4441, filed January 26, 1915.

What I claim is:

1. The method of maintaining or improving the efficiency of fullers' earth or earthy material of similar characteristics rendered more or less inefficient by percolation of liquid therethrough, which consists in treating the fullers' earth or earthy material with acid which dissolves or extracts ingredients of said earth or earthy material tending to produce fusion.

2. The method of maintaining or improving the efficiency of fullers' earth or earthy material of similar characteristics rendered more or less inefficient by its action on organic liquid, which consists in treating the fullers' earth or earthy material with acid which dissolves or extracts ingredients of said earth or earthy material tending to produce fusion.

3. The method of maintaining or improving the efficiency of fullers' earth or earthy material of similar characteristics rendered more or less inefficient by its action on oily liquid, which consists in treating the fullers' earth or earthy material with acid which dissolves or extracts ingredients of said earth or earthy material tending to produce fusion.

4. The method of maintaining or improving the efficiency of fullers' earth or earthy material of similar characteristics rendered more or less inefficient by its action on oily liquid, which consists in treating the fullers' earth or earthy material with a solvent for material extracted thereby from oily liquid, and thereafter treating said fullers' earth or earthy material with acid which dissolves or extracts ingredients of said earth or earthy material tending to produce fusion.

5. The method of maintaining or improving the efficiency of fullers' earth or earthy material of similar characteristics rendered more or less inefficient by its action on oily liquid, which consists in calcining said fullers' earth or earthy material, and thereafter treating the same with acid which dissolves or extracts ingredients of said earth or earthy material tending to produce fusion.

6. The method of maintaining or improving the efficiency of fullers' earth or earthy material of similar characteristics rendered more or less inefficient by its action on oily liquid, which consists in treating said fullers' earth or earthy material with a solvent for material extracted thereby from oily liquid, calcining said fullers' earth or earthy material, and thereafter treating the same with acid which dissolves or extracts ingredients of said earth or earthy material tending to produce fusion.

7. The method of maintaining or improving the efficiency of calcined fullers' earth or earthy material of similar characteristics rendered more or less inefficient by its action on oily liquid, which consists in treating the fullers' earth or earthy material with acid which dissolves or extracts ingredients of said earth or earthy material tending to produce fusion.

8. The method of maintaining or improving the efficiency of calcined fullers' earth or earthy material of similar characteristics rendered more or less inefficient by its action on oily liquid, which consists in treating the fullers' earth or earthy material with a solvent for material extracted thereby from oily liquid, and thereafter treating said fullers' earth or earthy material with acid which dissolves or extracts ingredients of said earth or earthy material tending to produce fusion.

9. The method of maintaining or improving the efficiency of calcined fullers' earth or earthy material of similar characteristics rendered more or less inefficient by its action on oily liquid, which consists in calcining said fullers' earth or earthy material, and thereafter treating the same with acid which dissolves or extracts ingredients of said earth or earthy material tending to produce fusion.

10. The method of maintaining or improving the efficiency of calcined fullers' earth or earthy material of similar characteristics rendered more or less inefficient by its action on oily liquid, which consists in treating said fullers' earth or earthy material with a solvent for material extracted thereby from oily material, calcining said fullers' earth or earthy material, and thereafter treating the same with acid which dissolves or extracts ingredients of said earth or earthy material tending to produce fusion.

11. The method of maintaining or improving the efficiency of calcined fullers' earth rendered more or less inefficient by its action on petroleum, which consists in treating said fullers' earth or earthy material with mineral acid which dissolves or extracts ingredients of said earth tending to produce fusion.

12. The method of maintaining or improving the efficiency of fullers' earth or earthy material of similar characteristics rendered more or less inefficient by its action on petroleum, which consists in treating said fullers' earth or earthy material with a solvent for material extracted thereby from petroleum, and thereafter treating the same with acid which dissolves or extracts ingredients of said earth or earthy material tending to produce fusion.

13. The method of maintaining or improving the efficiency of fullers' earth or earthy material of similar characteristics rendered more or less inefficient by its action on petroleum, which consists in calcining said fullers' earth or earthy material, and thereafter treating the same with acid which dissolves or extracts ingredients of said earth or earthy material tending to produce fusion.

14. The method of maintaining or improving the efficiency of fullers' earth or earthy material of similar characteristics rendered more or less inefficient by its action on petroleum, which consists in treating said fullers' earth or earthy material with a solvent for material extracted thereby from petroleum, calcining said fullers' earth or earthy material, and thereafter treating the same with acid which dissolves or extracts ingredients of said earth or earthy materal tending to produce fusion.

15. The method of maintaining or improving the efficiency of fullers' earth rendered more or less inefficient by percolation of petroleum therethrough, which consists in treating said fullers' earth with acid which dissolves or extracts ingredients of said earth tending to produce fusion.

16. The method of maintaining or improving the efficiency of fullers' earth or earthy material of similar characteristics rendered more or less inefficient by percolation of oily liquid therethrough, which consists in treating the fullers' earth or earthy material with acid which dissolves or extracts ingredients of said earth or earthy material tending to produce fusion, and thereafter calcining the same before further percolation of oily liquid therethrough.

17. The method of preparing fullers' earth or earthy material of similar characteristics for percolation of oily liquid therethrough, which consists in treating said fullers' earth or earthy material with acid which dissolves or extracts ingredients of said earth or earthy material tending to produce fusion.

18. The method of preparing fullers' earth or earthy material of similar characteristics for percolation of oily liquid therethrough which consists in treating said fullers' earth or earthy material with acid which dissolves or extracts ingredients of said earth or earthy material tending to produce fusion, and thereafter calcining the same.

19. The method of preparing fullers' earth or earthy material of similar characteristics for percolation of oily liquid therethrough, which consists in calcining said fullers' earth or earthy material, and thereafter treating the same with acid which dissolves or extracts ingredients of said earth or earthy material tending to produce fusion.

20. The method of treating fullers' earth or earthy material of similar characteristics rendered more or less inefficient by percolation of oily liquid therethrough, which consists in treating said fullers' earth or earthy material with acid to raise its fusion point, said acid dissolving or extracting ingredients of said earth or earthy material tending to produce fusion, whereby said fullers' earth or earthy material after subsequent percolation of oily liquid therethrough may be calcined at red heat.

21. The method of treating fullers' earth or earthy material of similar characteristics rendered more or less inefficient by percolation of oily liquid therethrough, which consists in calcining said fullers' earth or earthy material, and thereafter treating the same with acid to raise its fusion point, whereby said fullers' earth or earthy material after subsequent percolation of oily liquid therethrough may be calcined at temperatures higher than those employed during said first named calcining.

22. The method of treating fullers' earth or earthy material of similar characteristics rendered more or less inefficient by percolation of oil therethrough, which consists in extracting alkaline constituents therefrom.

23. The method of treating fullers' earth or earthy material of similar characteristics rendered more or less inefficient by percolation of oil therethrough, which consists in extracting therefrom by acid, said acid dissolving or extracting ingredients of said earth or earthy material tending to produce fusion therefrom.

24. A material for filtering, decolorizing or purifying oily liquid consisting of the residue of fullers' earth or earthy material of similar characteristics remaining after extraction therefrom of constituents inducing fusion in calcining.

25. A material for filtering, decolorizing or purifying oily liquid consisting of the residue of fullers' earth remaining after extraction therefrom of constituents inducing fusion at red heat.

26. The method of preparing fullers' earth or earthy material of similar characteristics for action upon oily liquid, which consists in calcining said fullers' earth or earthy material, treating said fullers' earth or earthy material with acid which dissolves or extracts ingredients of said earth or earthy material tending to produce fusion, and thereafter calcining the same.

In testimony whereof I have hereunto affixed my signature in the presence of the two subscribing witnesses.

MICHAEL J. WELSH.

Witnesses:
E. J. HENRY,
W. M. IRSH.

It is hereby certified that in Letters Patent No. 1,132,054, granted March 16, 1915, upon the application of Michael J. Welsh, of Philadelphia, Pennsylvania, for an improvement in "Earth-Treating Processes and Products," errors appear in the printed specification requiring correction as follows: Page 5, line 124, after the comma, insert the words *said acid dissolving or extracting ingredients of said earth or earthy material tending to produce fusion;* page 6, lines 9-12 strike out the comma and the words "said acid dissolving or extracting ingredients of said earth or earthy material tending to produce fusion therefrom" and insert the words *constituents inducing fusion in calcining;* and that the said Letters Patent should be read with these corrections therein that the same may conform to the record of the case in the Patent Office.

Signed and sealed this 3rd day of August, A. D., 1915.

[SEAL.]
R. F. WHITEHEAD,
*Acting Commissioner of Patents.*